United States Patent
Villa et al.

[11] Patent Number: 6,153,875
[45] Date of Patent: Nov. 28, 2000

[54] OPTICAL TWO-DIMENSIONAL POSITION SENSOR IN A CONTROL DEVICE FOR AUTOMOTIVE APPLICATIONS

[75] Inventors: Flavio Francesco Villa, Milan; Benedetto Vigna, Potenza; Paolo Ferrari, Gallarate, all of Italy

[73] Assignee: STMicroelectronics S.r.l., Agrate Brianza, Italy

[21] Appl. No.: 09/085,534

[22] Filed: May 27, 1998

[30] Foreign Application Priority Data

May 28, 1997 [EP] European Pat. Off. .............. 97830255

[51] Int. Cl.[7] .................................................. G01D 5/34
[52] U.S. Cl. .................. 250/208.2; 250/225; 250/231.18
[58] Field of Search .................................... 250/221, 225, 250/206.2, 208.2, 231.13, 231.14, 231.18, 222.1, 206.1, 208.6; 345/161

[56] References Cited

U.S. PATENT DOCUMENTS

| | | | |
|---|---|---|---|
| 3,697,761 | 10/1972 | Kamachi | 250/222 R |
| 4,458,226 | 7/1984 | Cho | 335/205 |
| 4,459,578 | 7/1984 | Sava et al. | 338/128 |
| 4,500,867 | 2/1985 | Ishitobi et al. | 338/128 |
| 4,574,286 | 3/1986 | Andresen | 340/870.31 |
| 4,584,510 | 4/1986 | Hollow | 318/584 |
| 4,977,361 | 12/1990 | Phillips et al. | 318/640 |
| 5,073,711 | 12/1991 | Brininstool et al. | 250/231.18 |
| 5,450,054 | 9/1995 | Schmersal | 338/128 |
| 5,530,345 | 6/1996 | Murari et al. | |

FOREIGN PATENT DOCUMENTS

| | | | |
|---|---|---|---|
| 0 501 906 A1 | 2/1992 | European Pat. Off. | G05K 11/18 |
| 3 405 688 A1 | 8/1985 | Germany | A63F 9/22 |
| 2 254 690 | 10/1992 | United Kingdom | G05G 9/047 |
| WO 91/20022 | 12/1991 | WIPO | G05G 9/047 |

*Primary Examiner*—John R. Lee
*Attorney, Agent, or Firm*—Theodore E. Galanthay; Robert Iannucci; Seed IP Law Group PLLC

[57] ABSTRACT

An optical two-dimensional position sensor including a selective optical unit which faces, and is displaceable relative to, an integrated device. The selective optical unit is formed by a polarized light source and a filter with four quadrants which permits passage of light through two quadrants only. The selective optical unit is attached to a control lever such as to translate in a plane along a first direction and a second direction, and to pivot around an axis which is orthogonal to the preceding directions. In a transparent package, the integrated device comprises a first group of sensor elements which are spaced along the first direction, a second group of sensor elements which are spaced along the second direction and a third group of sensor elements which detect an angular position of the selective optical unit. Electronics which are integrated with the sensor elements generates a code which is associated with each position which is assumed by the selective optical unit and a control signal which corresponds to a function to be performed.

18 Claims, 4 Drawing Sheets

|   | $10_1$ | $10_2$ | $10_3$ | $10_4$ | $10_5$ | $10_6$ | $10_7$ | $10_8$ | $10_9$ |
|---|---|---|---|---|---|---|---|---|---|
| A | 1 | 0 | 0 | 1 | 1 | 1 | 1 | 1 | 0 |
| B | 1 | 1 | 0 | 1 | 1 | 1 | 1 | 1 | 0 |
| C | 1 | 1 | 1 | 1 | 1 | 1 | 1 | 1 | 0 |
| D | 1 | 0 | 0 | 0 | 1 | 1 | 1 | 1 | 0 |
| E | 1 | 1 | 0 | 0 | 1 | 1 | 1 | 1 | 0 |
| F | 1 | 1 | 1 | 0 | 1 | 1 | 1 | 1 | 0 |
| G | 1 | 0 | 0 | 0 | 0 | 1 | 1 | 1 | 0 |
| H | 1 | 1 | 0 | 0 | 0 | 1 | 1 | 1 | 0 |
| I | 1 | 1 | 1 | 0 | 0 | 1 | 1 | 1 | 0 |
| L | 1 | 0 | 0 | 0 | 0 | 0 | 1 | 1 | 0 |
| M | 1 | 1 | 0 | 0 | 0 | 0 | 1 | 1 | 0 |
| N | 1 | 1 | 1 | 0 | 0 | 0 | 1 | 1 | 0 |

Fig. 8

|   | $10_1$ | $10_2$ | $10_3$ | $10_4$ | $10_5$ | $10_6$ | $10_7$ | $10_8$ | $10_9$ |
|---|---|---|---|---|---|---|---|---|---|
| A | 0 | 0 | 0 | 0 | 0 | 1 | 1 | 1 | 1 |
| B | 0 | 0 | 0 | 0 | 1 | 1 | 1 | 1 | 1 |
| C | 0 | 0 | 0 | 1 | 1 | 1 | 1 | 1 | 1 |
| D | 1 | 1 | 0 | 0 | 0 | 0 | 1 | 1 | 1 |
| E | 0 | 1 | 1 | 0 | 0 | 1 | 1 | 1 | 1 |
| F | 0 | 0 | 1 | 1 | 1 | 1 | 1 | 1 | 1 |
| G | 1 | 1 | 1 | 0 | 0 | 0 | 0 | 1 | 1 |
| H | 1 | 1 | 1 | 1 | 0 | 0 | 1 | 1 | 1 |
| I | 0 | 1 | 1 | 1 | 1 | 1 | 1 | 1 | 1 |
| L | 1 | 1 | 1 | 1 | 0 | 0 | 0 | 1 | 1 |
| M | 1 | 1 | 1 | 1 | 0 | 0 | 1 | 1 | 1 |
| N | 1 | 1 | 1 | 1 | 1 | 1 | 1 | 1 | 1 |

Fig. 9

OPTICAL TWO-DIMENSIONAL POSITION SENSOR IN A CONTROL DEVICE FOR AUTOMOTIVE APPLICATIONS

TECHNICAL FIELD

The present invention relates to an optical two-dimensional position sensor, in particular for automotive applications.

BACKGROUND OF THE INVENTION

As is known, auxiliary functions of an automobile are at present controlled from the steering wheel with multifunction switch systems. For example, switching on running and tail lights, high-beam, low-beam and turn indicator lights, are provided by means of sliding mechanical contacts. The production of switches based on sliding mechanical contacts is particularly costly, and the switches suffer from problems which are associated with the contacts themselves (wear, aging, etc.). Systems which do not require sliding mechanical contacts to control these auxiliary functions are thus desirable. In general these problems with sliding mechanical contacts also apply to all applications which include transmission of a plurality of commands or signals by means of movement of a control unit which acts on sliding contacts, and in which there is a large number of activations of the control unit.

SUMMARY OF THE INVENTION

According to principles of the present invention, an optical position sensor is provided which includes a selective optical unit having light emission areas which alternate with areas without light emission. The selective optical unit is displaceable relative to a plurality of light sensitive elements such that each relative position of the selective optical unit is detected by the light sensitive elements which generate a signal having a value dependent on the position of the selective optical unit. The optical position sensor may be used in a control device for controlling an auxiliary function in an automobile.

BRIEF DESCRIPTION OF THE DRAWINGS

In order to enable the present invention to be understood, a preferred embodiment is now described, purely by way of non-limiting example, with reference to the attached drawings, in which:

FIGS. 8 and 9 show tables relating to codes which can be obtained for different relative positions of the components of the sensor according to the embodiment of the present invention.

DETAILED DESCRIPTION OF THE INVENTION

Figure 1:
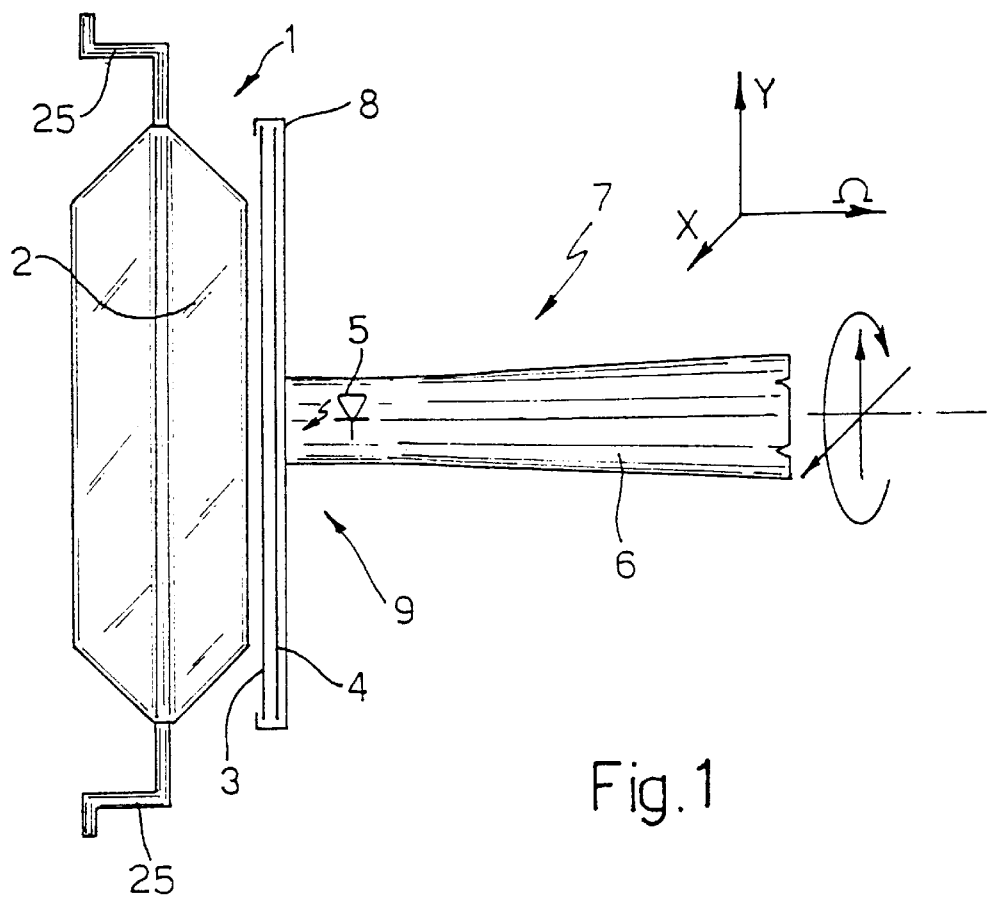
FIG. 1 is a lateral view of a control device which uses a sensor according to an embodiment of the present invention.

As shown in FIG. 1, an optical sensor 1 according to an embodiment of the invention comprises an integrated device 2, a first polarization filter 3, a second polarization filter 4, and a light source 5. The first and second polarization filters 3, 4 and the light source 5 are integral with one another such as to form a selective light unit 9 which provides light-emitting areas which alternate with non-emitting areas. Therefore, the selective light unit 9 is a selective light generator that has selected light emitting areas structured to emit light and selected light blocking areas structured to block light emissions. The selective light unit 9 is displaceable relative to the integrated device 2, and parallel to it, and may be displaced along a plane which is defined by two different coordinates X and Y. The selective light unit 9 is also structured to pivot around an axis Ω which is perpendicular to the plane X-Y.

The selective light unit 9 may be proximate to or in contact with the integrated device 2 as it is displaced relative to the integrated device 2. In the example shown, the optical sensor 1 is mounted on a control unit, in this embodiment a lever 6, such as to form together with the lever 6 a control device 7 which can be controlled manually or by a machine, and which at its output generates an electric control signal which can be used by an actuator.

In particular the first and second polarization filters 3 and 4 are rendered integral with the lever 6 by means of a support 8, and the light source 5, which may, for example, be a set of diodes, a bulb or a laser source, is accommodated inside the lever 6, such that the selective light unit 9 follows the movements of the lever 6, in translation according to the axes X and Y, and in pivoting around the axis Ω. According to the embodiment of the invention, the lever 6 is in the form of a common control lever which is attached to the steering wheel of an automobile by means of a coupling (not shown). The lever 6 is part of a multifunction switch system such as to transform the actuations of the lever 6 by the driver into the pivoting-translation movements of the selective light unit 9. In particular, a well known guide mechanism (not shown) permits only discrete movements of the selective light unit 9 relative to the integrated device 2, as will be described in greater detail with reference to FIGS. 6 and 7.

Figure 5:
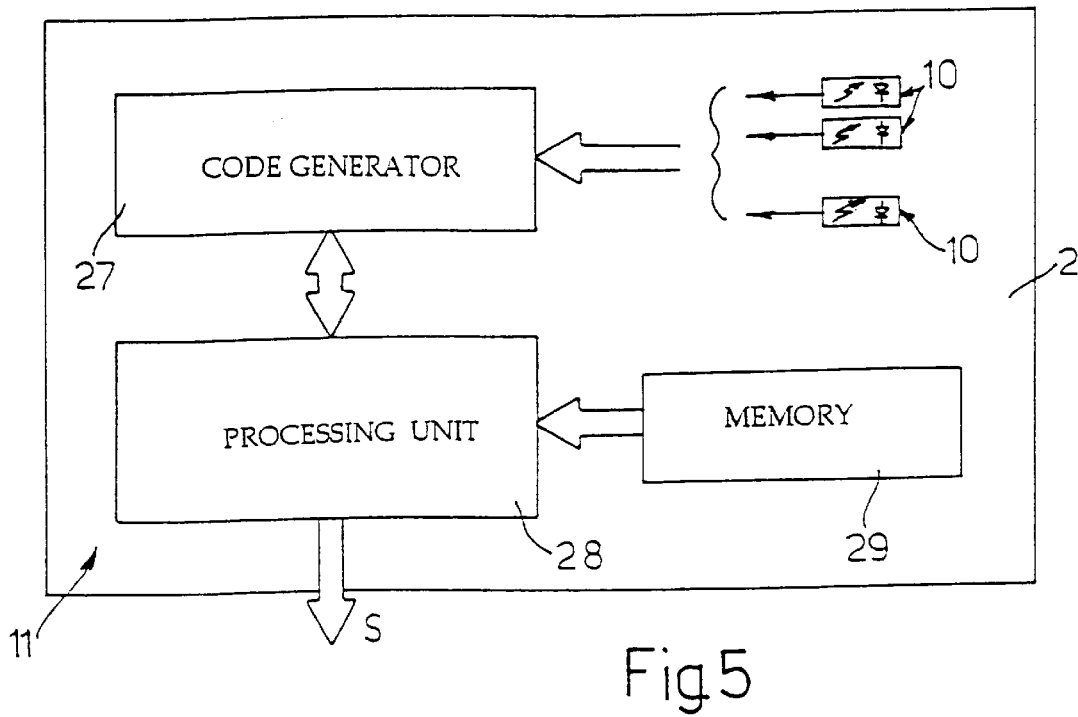
FIG. 5 shows a block diagram of the first component of the sensor according to the embodiment of the present invention.

As shown in FIG. 5, the integrated device 2 according to the embodiment of the invention includes a plurality of light-sensitive elements 10, hereinafter called sensor elements 10, which may, for example, be receiver photodiodes which are of a known type and are therefore not shown, and a coding system 11. The integrated device 2 is assembled in a package which is transparent to light, as indicated by the lines in FIG. 1, such as to allow the light emitted by the light-emitting areas of the selective light unit 9 to reach the sensor elements 10.

Figure 2:
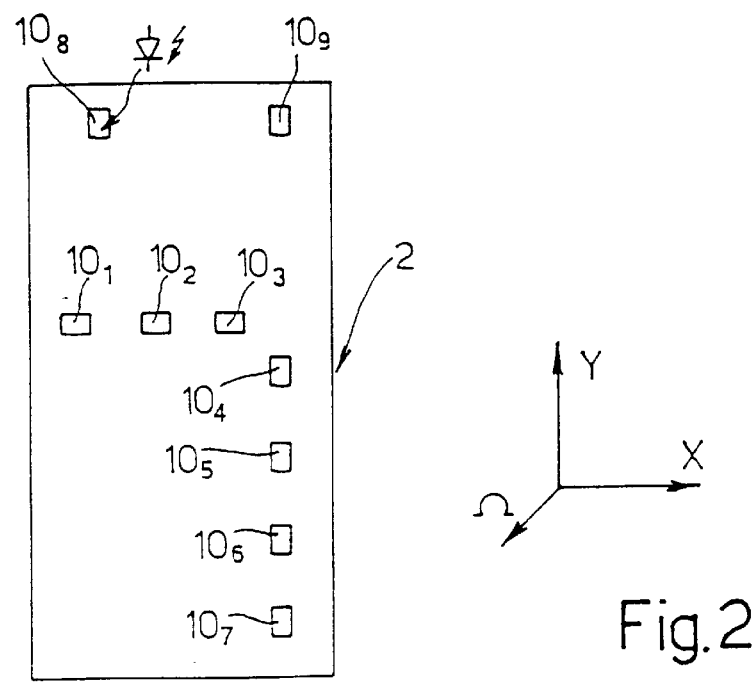
FIG. 2 shows schematically an arrangement of sensor elements on a first component of the sensor according to the embodiment of the present invention.

FIG. 2 shows a possible arrangement of the sensor elements 10 in the integrated device 2 according to the embodiment of the invention for a detection of 3×4 positions of the selective light unit 9 in the plane X-Y, and for a detection of a pivoting angle of the selective light unit 9 of ±45° around the axis Ω (i.e., altogether of three different angular positions of the selective light unit 9). As can be seen, three sensor elements $10_1$–$10_3$ are spaced along a first direction (direction X), four sensor elements $10_4$–$10_7$ are spaced along a second direction (direction Y) perpendicular to the first direction X, and there are two further sensor elements $10_8$ and $10_9$ which are disposed spaced from the sensor elements $10_1$–$10_7$, for a detection of the pivoting angle of the selective light unit 9.

In general however, in order to detect M position of the selective light unit 9 along the direction X, and N positions of the selective light unit 9 along the direction Y, at least M+N sensor elements are needed, whereas in order to detect the pivoting angle of the selective light unit 9, two sensor elements 10 are used in the case of a ±45° pivoting angle, and four sensor elements 10 are used in the case of a ±30° pivoting angle relative to a nominal position at an angle of zero.

Figure 3:
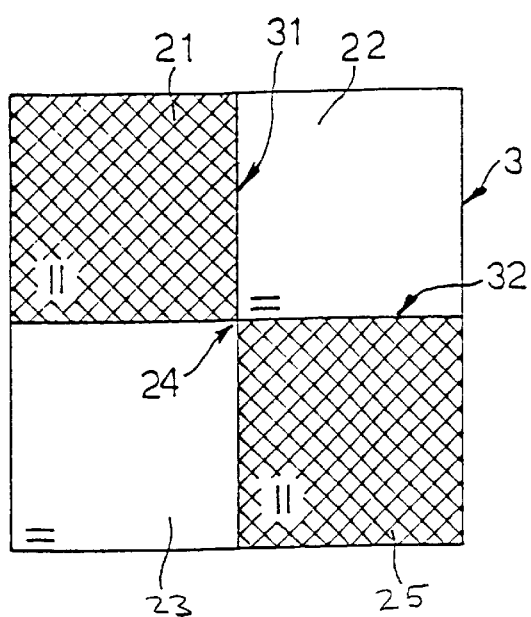
FIG. 3 shows a second component of the sensor according to the embodiment of the present invention.
Figure 4:
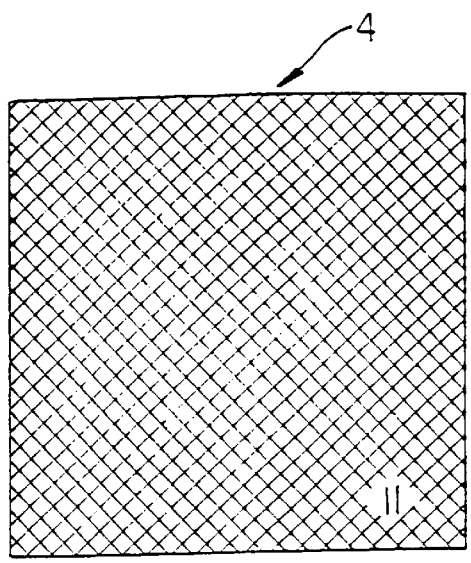
FIG. 4 shows a third component of the sensor according to the embodiment of the present invention.

As shown in the front view in FIG. 3, according to the embodiment of the invention, the first polarization filter 3 has four quadrants, which are polarized with axes of polarization alternately parallel to the axis of polarization of the light (quadrants 21 and 25 identified by the symbol ||) and perpendicular to the axis of polarization of the light (quadrants 22 and 23, identified by the symbol =). The quadrants 21, 22, 23, and 25 join at a center 24 and having such dimensions that, according to the position assumed by the selective light unit 9 relative to the integrated device 2, each of the sensor elements 10 sees a specific quadrant 21, 22, 23, or 25. In addition, as shown in the front view in FIG. 4, the second polarization filter 4 has a uniform polarization according to a single axis of polarization.

In operation, the second polarization filter 4 filters the light generated by the light source 5 such as to permit passage of a polarized component of the light having one direction of propagation only which is aligned with the axis of polarization of the second polarization filter 4, and the first polarization filter 3 permits passage of the polarized component of the light filtered through the quadrants 21 and 25 only. As a result, only the sensor elements $10_1$–$10_9$ which face the quadrants 21 and 25 detect the light, generating a corresponding electric signal which for example has a value greater than zero.

As shown in FIG. 5, the signals generated by the sensor elements 10 are supplied to the coding system 11, which comprises a code generator block 27 which is arranged to generate codes, a processing unit 28 and a memory 29 which stores the association of each code which can be generated by the code generator block 27 with a command.

In particular the code generator block 27 receives the electric signals generated by the sensor elements 10 which face the quadrants 21 and 25, and generates a digital code with several bits, for example generating a logic "1" in the case of receipt of the signal when the corresponding sensor element 10 faces a quadrant 21 or 25 and a logic "0" in the absence of a signal when the corresponding senor element 10 faces a quadrant 22 or 23. In practice the code generator block 27 can be made up of a set of comparators which compare the signal received with a reference value which is close to zero. The binary code thus obtained, which has nine bits in the case of the integrated device with nine sensor elements 10 in FIG. 1, is supplied to the processing unit 28, which, on the basis of the code received and the code stored in the memory 29, determines the corresponding command (lighting of the running and tail lights, low- and high-beam lights or another command) and generates an output signal S, which is supplied via pins 25 of the integrated device 2 shown in FIG. 1 to the corresponding actuator (not shown) and/or to a system of the vehicle (not shown) for processing.

It will be appreciated that in order to distinguish the various positions of the selective light unit 9 relative to the integrated device 2, each position which can be assumed by the selective light unit 9 must have an individual code which does not coincide with that of any other position, i.e., in each position, at least one of the sensor elements 10 must be facing a quadrant 21, 22, 23 or 25 which differs from that for all the other positions. In particular as far as translation is concerned, for each translation of the selective light unit 9, the center 24 of the first and second polarization filters 3, 4 must go to a different side of at least one of the seven sensor elements $10_1$–$10_7$; in the case of the sensor elements $10_1$–$10_9$ in FIG. 1, the center 24 of the first polarization filter 3 can thus assume approximately one of the positions shown in FIG. 6 according to the embodiment of the invention, identified by the letters A–N.

Figure 6:
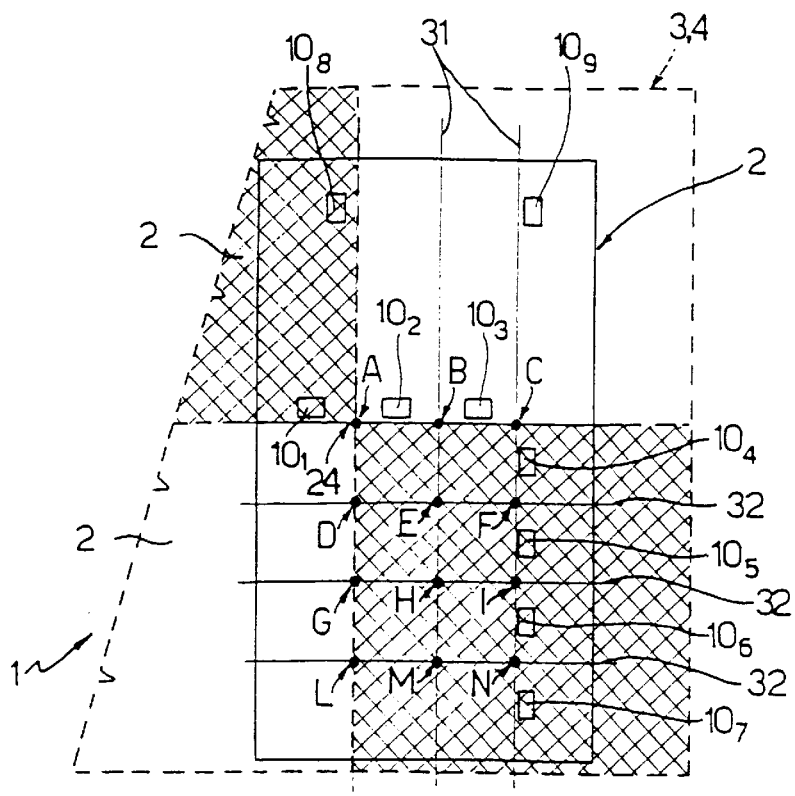
FIGS. 6 and 7 show schematically two diagrams of a cooperation between the components of the sensor according to the embodiment of the present invention.

In particular in FIG. 6, the horizontal and vertical lines are aligned in each position A–N with separation lines indicated 31, 32 of the quadrants 21, 22, 23 and 25 of the first polarization filter 3 (of FIG. 3) and the selective light unit 9 is represented in the position in which the center 24 of the first polarization filter 3 is disposed in the position A; consequently displacements of the selective light unit 9 relative to the integrated device 2 such as to make the center 24 of the first polarization filter 3 correspond to the positions A–N, give rise to generation of corresponding codes, as shown for example in the table in FIG. 8. As can be seen, the sensor elements $10_8$ and $10_9$ are constant for each translation in the plane X-Y and assume different values.

Figure 7:
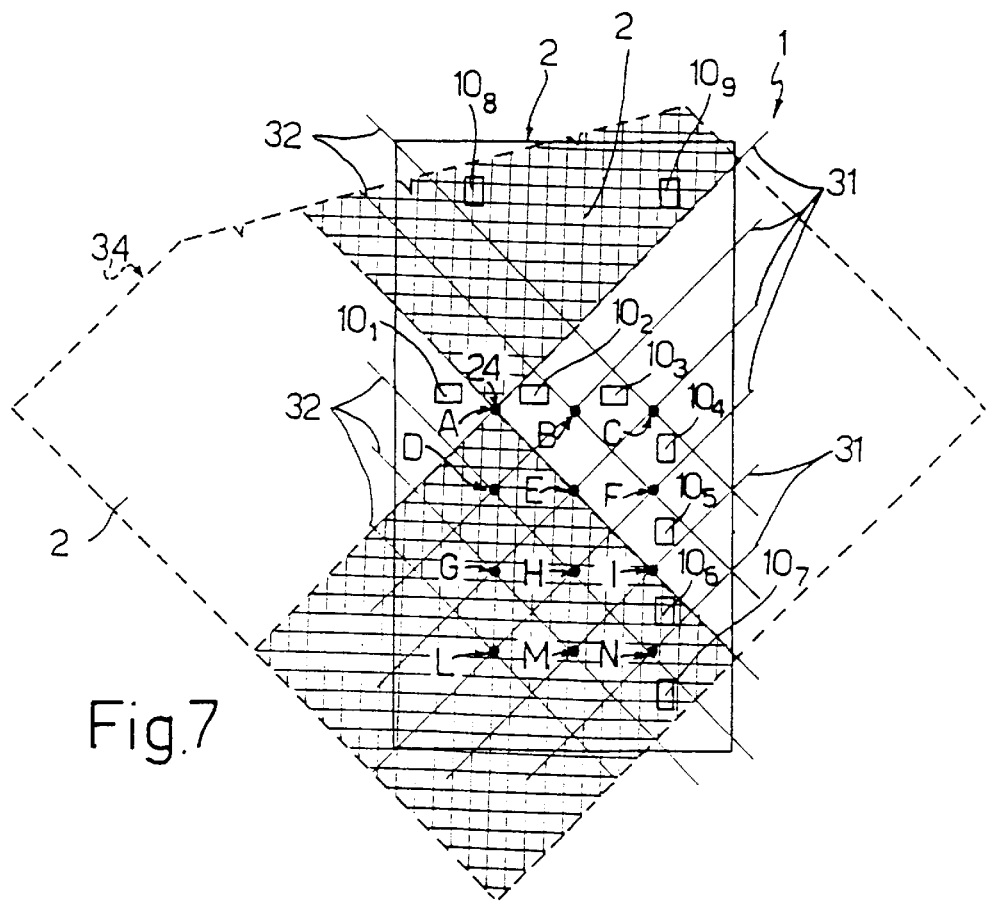

Similarly, FIG. 7 shows, according to the embodiment of the invention, the position of the selective light unit 9 relative to the integrated device 2 when the selective light unit 9 is centered on the position A and pivoted by 45° clockwise relative to FIG. 6. It also shows the lines of separation 31, 32 of the quadrants 21, 22, 23, and 25 of the first polarization filter 3 in the different positions A–N. As can be seen, these separation lines 31, 32 are now inclined by ±45°. In this case therefore, the coding shown in the table in FIG. 9 is obtained. As can be seen, the sensor elements $10_8$ and $10_9$ are always associated with a logic "1".

In a manner not shown, owing to the symmetry of the system, pivoting of the selective light unit 9 in the direction opposite to that in FIG. 7 (i.e., by 45° anti-clockwise relative to FIG. 6) provides a table which is complementary to that in FIG. 9.

The optical sensor described has the following advantages. Firstly it has a low cost, associated with the manufacturing cost of the integrated devices. Furthermore, it is highly reliable and durable since it does not involve the use of mechanical sliding contacts, and the selective light unit 9 can also be slightly spaced from the integrated device 2. Also, the number of controls which can be implemented can easily be increased.

Finally it is apparent that changes and variants can be made to the sensor described and illustrated here, without departing from the protective context of the present invention, as defined in the attached claims. In particular it is emphasized that if the light source 5 is a laser source or another source of polarized light, the second polarization filter 4 is no longer necessary. In addition, the processing electronics for the signals generated by the sensor elements 10, or at least some of them, need not be integrated with the sensor elements 10, if this is desirable or appropriate for specific applications.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An optical two-dimensional position sensor comprising:

a selective optical unit with a plurality of areas, including light emission areas which alternate with areas without light emission, said selective optical unit being displaceable relative to a plurality of light-sensitive elements, wherein in each relative position of said selective optical unit, said plurality of light-sensitive elements face said plurality of areas and each light-sensitive element is structured to generate a signal having a value depending on the area of said selective optical unit said light-sensitive element is facing, wherein said selective optical unit is structured to be displaced in a plane along a first diverging direction and a second diverging direction and to pivot around an axis which is orthogonal to said first and second diverging directions, said plurality of light-sensitive elements comprising a first group of light-sensitive elements which are spaced along said first diverging direction, a second group of light-sensitive elements which are spaced along said second diverging direction, and a third group of light-sensitive elements which detect an angular position of said selective optical unit.

2. An optical two-dimensional position sensor according to claim 1 wherein said light-sensitive elements comprise photo-diodes.

3. An optical two-dimensional position sensor according to claim 1 wherein said light-sensitive elements are incorporated in an integrated device which has a transparent package.

4. An optical two-dimensional position sensor comprising:

a selective optical unit with a plurality of areas, including light emission areas which alternate with areas without light emission, said selective optical unit being displaceable relative to a plurality of light-sensitive elements, wherein in each relative position of said selective optical unit, said plurality of light-sensitive elements face said plurality of areas and each light-sensitive element is structured to generate a signal having a value depending on the area of said selective optical unit said light-sensitive element is facing, wherein said selective optical unit comprises a light generator and a filter element which has selected areas which are light transmissive and selected areas which are opaque.

5. An optical two-dimensional position sensor according to claim 4 wherein said light generator comprises a light generator which is polarized with a predetermined polarization, and said filter element comprises a first polarization filter which has first areas having a polarization which is parallel to said predetermined polarization, and second areas having a polarization which is perpendicular to said predetermined polarization.

6. An optical two-dimensional position sensor according to claim 5 wherein said light generator comprises a non-polarized light source and a second polarization filter structured to filter light from the light generator with said predetermined polarization.

7. An optical two-dimensional position sensor according to claim 5 wherein said light generator comprises a laser source.

8. An optical two-dimensional position sensor according to any one of claims 5–7 wherein said first polarization filter has four quadrants formed by said first areas and said second areas, which alternate with one another.

9. An optical two-dimensional position sensor comprising:

a selective optical unit with a plurality of areas, including light emission areas which alternate with areas without light emission, said selective optical unit being displaceable relative to a plurality of light-sensitive elements, wherein in each relative position of said selective optical unit, said plurality of light-sensitive elements face said plurality of areas and each light-sensitive element is structured to generate a signal having a value depending on the area of said selective optical unit said light-sensitive element is facing; and a code generator unit, a code memory and a processing unit, said code generator unit being connected to said light-sensitive elements and being structured to generate a digital code which is correlated to the signals of said light-sensitive elements, said code memory being structured to store a correspondence between a plurality of digital codes and a plurality of commands, and said processing unit being connected to said code generator unit to receive said digital code and said code memory for generating a control signal which corresponds to said digital code received from said code generator unit according to said stored correspondence.

10. A control device comprising:

a control member which is structured to be displaced into a plurality of different positions;

a selective light generator fixed in the control member, said selective light generator having selected light emitting areas structured to emit light and selected light blocking areas structured to block light emissions; and an electronic device having a plurality of light detectors structured to detect light emitted from said light emitting areas and to detect an absence of light from said light blocking areas, said electronic device being structured to generate one or more control signals based on a position of said control member indicated by said light emitting areas and said light blocking areas.

11. A control device according to claim 10 wherein said control member comprises a control lever for a multi-functional switch system coupled to a steering wheel in an automobile.

12. A control device according to claim 10 wherein said selective light generator comprises:

a directed light source structured to generate light aligned with a predetermined axis; and a polarizing filter having first areas with an axis of polarization parallel to the predetermined axis and second areas with an axis of polarization substantially orthogonal to the predetermined axis such that the light from the directed light source passes through the first areas and the second areas substantially block the light from the directed light source.

13. A control device according to claim 12 wherein the directed light source comprises a laser.

14. A control device according to claim 10 wherein the electronic device comprises:

a plurality of photodiodes arranged in a transparent package, each photodiode being structured to generate a signal based on an amount of light incident on the photodiode;

a code generator circuit coupled to each of the photodiodes to receive the signals generated by the photodiodes, the code generator circuit being structured to generate a digital code based on the signals generated by the photodiodes;

a memory circuit structured to store a plurality of digital codes and associated commands, each stored digital code corresponding to a position of the control member; and a processing circuit coupled to the code generator circuit to receive the digital code and coupled to the memory circuit to access the digital codes and the associated commands stored in the memory circuit, the processing circuit being structured to compare the digital code received from the code generator circuit with the digital codes stored in the memory circuit and to select a command stored in the memory circuit based on the comparison, the processing circuit being structured to generate a control signal based on the command and to provide the control signal to a system external to the control device.

15. A method for controlling an auxiliary function comprising:

generating a pattern of light having alternate areas with light emission and areas without light emission;

detecting the pattern of light;

generating one or more control signals based on the detected pattern of light; and controlling the auxiliary function based on the control signals, wherein the act of generating one or more control signals comprises:

receiving the plurality of signals from the light sensitive elements;

generating a digital code based on the plurality of signals;

selecting a command based on the digital code; and generating the one or more control signals based on the selected command.

16. The method of claim 15 wherein the act of generating the pattern of light comprises generating the pattern of light from a light source in a movable switch member.

17. The method of claim 16 wherein the act of generating the pattern of light further comprises moving the movable switch member to charge the pattern of light.

18. The method of claim 17 wherein the act of detecting the pattern of light comprises:

detecting the pattern of light with a plurality of light-sensitive elements;

generating a signal in each light sensitive element based on light detected by the light-sensitive element to generate a plurality of signals; and changing the plurality of signals in response to a movement of the movable switch member.

* * * * *

UNITED STATES PATENT AND TRADEMARK OFFICE
CERTIFICATE OF CORRECTION

PATENT NO. : 6,153,875
DATED : November 28, 2000
INVENTOR(S) : Flavio Francesco Villa et al.

It is certified that error appears in the above-identified patent and that said Letters Patent is hereby corrected as shown below:

Column 8, claim 17,
Line 12, "to charge the pattern" should read as -- to change the pattern -- in the issued patent.

Signed and Sealed this

Fifth Day of March, 2002

Attest:

JAMES E. ROGAN
Attesting Officer   Director of the United States Patent and Trademark Office